(No Model.)
A. J. WALKER.
HUB ATTACHING DEVICE.
No. 587,411. Patented Aug. 3, 1897.
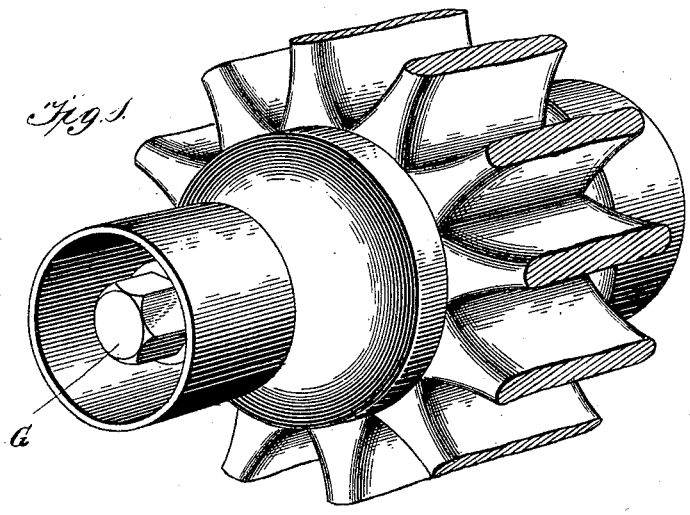
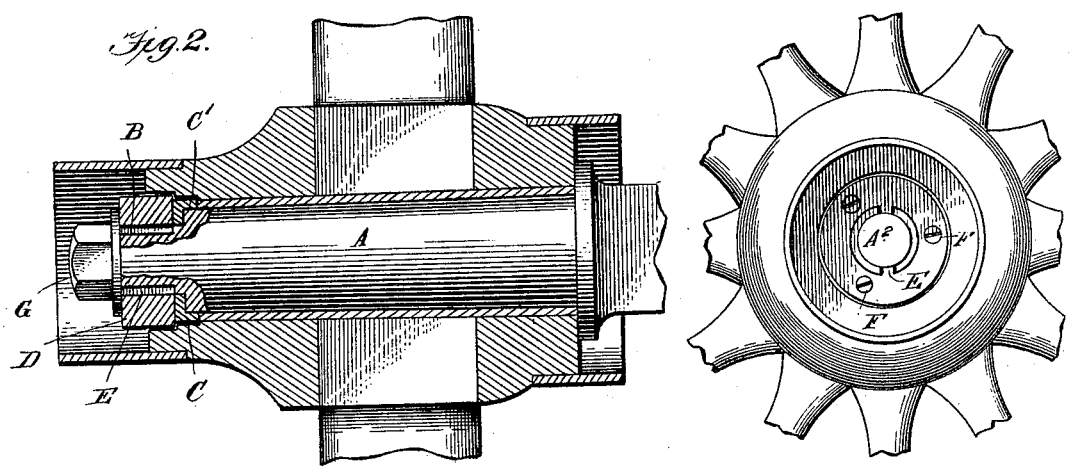
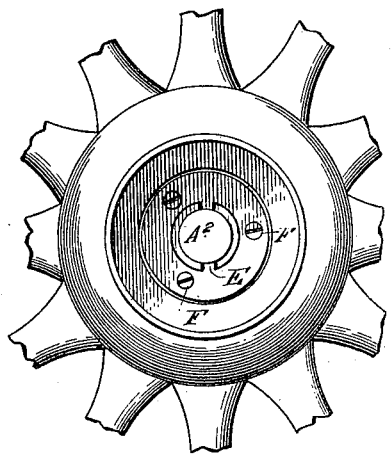
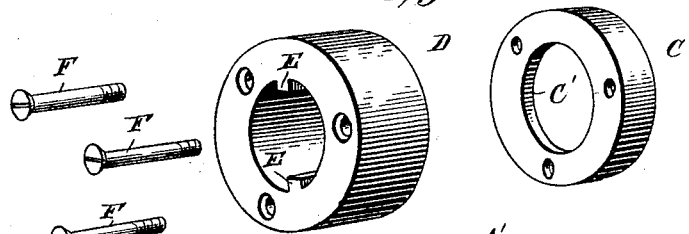
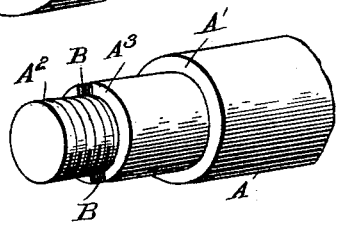
WITNESSES:
INVENTOR
A. J. Walker,
BY
ATTORNEYS.

UNITED STATES PATENT OFFICE.

ADONIRAM JUDSON WALKER, OF DALTON, MASSACHUSETTS.

HUB-ATTACHING DEVICE.

SPECIFICATION forming part of Letters Patent No. 587,411, dated August 3, 1897.

Application filed June 16, 1896. Serial No. 595,814. (No model.)

*To all whom it may concern:*

Be it known that I, ADONIRAM JUDSON WALKER, a citizen of the United States, residing at Dalton, in the county of Berkshire, in the State of Massachusetts, have invented a new and useful Hub-Attaching Device, of which the following is a specification.

This invention relates entirely to a device for attaching and securing hubs and wheels upon axles, the object being to provide a device which can be quickly and easily applied and removed, and one which will prevent parts from working loose.

Another object is to provide a hub-attaching device which will do away with the use of washers; and a still further object is to provide a hub-attaching device which will take up the wear of the parts and prevent rattling or wabbling of the wheel.

With these various objects in view my invention consists in the peculiar construction of various parts, an entirely novel combination and arrangement, all of which will be fully described hereinafter and pointed out in the claim.

In the drawings forming a part of this specification, Figure 1 is a view showing my invention in use. Fig. 2 is a vertical longitudinal section of the hub, axle, and attaching device. Fig. 3 shows the end of the hub, and Fig. 4 the attaching device separate from the axle and hub.

In carrying out my invention I employ an axle A, having a shoulder $A'$. Between the shoulder $A'$ and the threaded end $A^2$ is provided a second shoulder $A^3$. The shoulder $A^3$ is cut away and grooved, as shown at B, in one or more places, as desired, the purpose of which will appear later on.

Fitted within the forward end of the hub and upon the shoulder $A^3$ of the axle is a circular ring or disk C, resting firmly against the shoulder $A'$, said ring or disk having an annular groove $C'$ to receive the shoulder $A'$, so that when the ring or disk is fitted upon the axle the forward face of the ring or disk will be flush with the bottom of the groove or cut-out portion of the shoulder $A^3$.

Fitted upon the shoulder $A^3$ and bearing against the ring C is a second ring D, considerably thicker than the first one and having one or more longitudinal interior ribs E, which engage the grooves or cut-away portion B and thereby lock the ring D securely and prevent the same from turning.

The ring D is slightly larger in diameter than the ring C, though this is not absolutely essential.

The ring D is of such a length that when its ribs enter the grooves the ends of the ribs will rest firmly in the grooves, and rings C D are securely united by bolts F or any other suitable means of attachment. The end nut G is then secured upon the threaded end of the axle the same as usual, and securely binds the various parts upon the axle and securely locks the hub upon the said axle.

The rib does not fit the groove perfectly tight, so that the hub-attaching device or the rings have a limited movement upon the end of the axle, thereby preventing parts from binding.

By this construction the use of washers is avoided, and all undue wear of the parts can be taken up and the wheel prevented from wabbling and rattling.

Having thus described my invention, what I claim as new, and desire to secure by Letters Patent, is—

The combination with the axle A, having the shoulders $A'$, $A^3$ and threaded end $A^2$, the shoulder $A^3$ being grooved at B, of the ring or disk C, having an annular groove $C'$ to receive the shoulder $A'$, and the ring D thicker than the ring C and provided with internal longitudinal ribs E entering the grooves B of the shoulder $A^3$ of the axle, means for securing the rings C D together, and the nut G on the threaded end of the axle, substantially as shown and described.

ADONIRAM JUDSON WALKER.

Witnesses:
 EDGAR HUSE PIERCE,
 JENNIE EMILY PIERCE.